United States Patent

Zacaroli

[15] 3,700,828

[45] Oct. 24, 1972

[54] MAGNETIC HEAD ASSEMBLY WITH LOW READ TO WRITE CROSSTALK

[72] Inventor: Edward C. Zacaroli, Utica, N.Y.

[73] Assignee: Hamilton Digital Controls, Inc., Utica, N.Y.

[22] Filed: Oct. 7, 1971

[21] Appl. No.: 191,545

Related U.S. Application Data

[63] Continuation-in-part of Ser. No. 34,138, May 4, 1970, abandoned.

[52] U.S. Cl.......................179/100.2 C, 340/174.1 F

[51] Int. Cl...............................................G11b 5/10

[58] Field of Search................179/100.2 C, 100.2 K; 340/174.1 F; 346/74 MC

[56] References Cited

UNITED STATES PATENTS 3,432,839 3/1969 Stapper...............340/174.1 F 3,591,729 7/1971 Camras..............179/100.2 C

*Primary Examiner*—Bernard Konick

*Assistant Examiner*—Jay P. Lucas

*Attorney*—Howard C. Miskin

[57] ABSTRACT

A low crosstalk read and write magnetic tape recording head assembly includes longitudinally spaced banks of transversely spaced dual gap electromagnetic transducer elements provided with respective windings. A shield formed of a low reluctance, magnetically soft material includes a first panel disposed between and spaced from the transducer banks and offset toward the write transducers, a second panel extending outwardly from the outer front edge of the read transducers with its inner edge spaced closely from the transducer edge, and a pair of transversely spaced parallel panels interconnecting the first and second panels.

13 Claims, 5 Drawing Figures

PATENTED OCT 24 1972 3,700,828

INVENTOR.
EDWARD C. ZACAROLI
BY Howard C. Miskin
ATTORNEY.

MAGNETIC HEAD ASSEMBLY WITH LOW READ TO WRITE CROSSTALK

This application is a continuation-in-part of copending U.S. Pat. application No. 34,138 filed May 4, 1970 entitled "Magnetic Head", now abandoned.

BACKGROUND OF THE INVENTION

The present invention relates generally to improvements in information recording and reproducing devices, and it relates particularly to an improved magnetic tape recording read and write head.

The conventional high speed multichannel magnetic recording head, which records and reads information on a magnetic record member, such as magnetic tape, disc, drum or the like, generally includes longitudinally spaced read and write banks of transversely spaced electromagnetic recording or transducer elements, each of which includes a wire-wound closed-loop core of magnetic material having a magnetic flux gap in its front face and usually a second gap in its rear face. The banks are normally transverse to the direction of movement of the tape. An important consideration in the use of these recording heads is the problem of write to read crosstalk or feedthrough, which occurs as a consequence of the magnetic flux generated at the write-in transducer element entering the read-out transducer element. While this problem is not serious where sufficient spacing is provided between the write-in and read-out transducer elements, in order to increase the speed of servo performance it has become necessary to reduce the distance between the write-in and read-out transducers with a consequent excess increase in crosstalk. An expedient which has been employed to minimize this crosstalk is to position a first panel of magnetically soft material, that is, a magnetic material which is amenable to rapid changes in magnetic flux, midway between the electromagnetic write-in and read-out transducers, and a panel of such material across and forward of the front face of the write-in transducer to the proximity of the first panel as disclosed in U.S. Pat. No. 3,432,839. Also, the use of windings and circuitry have been disclosed in U.S. Pat. No. 3,479,662 to produce a cancelling field of opposing phase as the feedthrough, so as to reduce feedthrough noise. While these arrangements are helpful in effecting a reduction in crosstalk, they are accompanied by numerous drawbacks and disadvantages. By reasons of the procedures and construction which are employed, these are expensive expedients. The loading and unloading of the recording tape where external shields are employed is an awkward, cumbersome and time-consuming procedure, since the front shield must be removed and replaced, or the tape must be threaded through the space between the head and shield which space is of small dimensions, so that there is an ever present danger of damaging the tape. In addition, where use of automatic tape lacing or cassette or cartridge type tape storage devices are desired, such use, for all practical purposes, is prevented by the front shield. Moreover, in the event of any failure in the sensing of the end of the tape, the tape leader may be drawn between the head and the shield and cause damage to the head.

SUMMARY OF THE INVENTION

It is a principal object of the present invention to provide an improved magnetic recording head.

Another object of the present invention is to provide an improved low crosstalk write-read magnetic recording head.

Still another object of the present invention is to provide an improved multi-channel low crosstalk write-read magnetic recording head of the type with small spacing between the read and write banks.

A further object of the present invention is to provide a multi-channel low crosstalk magnetic recording head which does not interfere with or impede the normal loading and unloading of the recording tape or the advance or manipulation thereof, and permits the use of tape cassettes and cartridges.

Still a further object of the present invention is to provide a recording head of the above nature provided with crosstalk reducing shield means characterized by its reliability, low cost, adaptability and versatility.

The above and other objects of the present invention will become apparent from a reading of the following description taken in conjunction with the accompanying drawing, which illustrates a preferred embodiment thereof.

In a sense the present invention contemplates the provision of a magnetic tape recording head including longitudinally spaced read and write electromagnetic transducers, each including a core of magnetic material having a gapped front face and a winding, the improvement comprising a crosstalk reducing shield of a magnetic material including a first panel positioned between said transducer cores and a second panel extending longitudinally outwardly from the outer edge of said read transducer front face with some surface coupling, and means providing a low reluctance magnetic flux path between said first and second shield panels. A sharp reduction in crosstalk is unexpectedly achieved by offsetting the first panel toward the write transducer and the optimum amount of offset depends on the structure of the head, the material of the panel and the recording frequency, and may be readily determined in each case by one skilled in the art.

In its preferred form, the recording head includes a pair of longitudinally spaced read and write banks of transversely stacked side by side electromagnetic transducers, each transducer comprising a closed loop magnetic core with a transversely gapped longitudinally curved front face and a rear transverse gap, the cores having parallel longitudinally spaced inner legs and coil carrying outer legs. The first shield panel is positioned between the transducer banks, and is longitudinally offset toward the write transducer bank and parallel to the inner legs, and extend from the plane of the front inner edges of the cores, and projects beyond the opposite sides of the transducer banks. The second panel is about the width of the first panel and has an inner edge registering with a stepped transverse groove formed in the outer edge of the front face of the read transducer bank and is spaced a short distance from the respective cores; the second panel lies approximately in the plane of the read bank front face and ordinarily overlies a portion thereof. The magnetic flux path between the first and second panels is defined by a pair of opposite parallel third panels of magnetically soft material extending from the side edges of the first panel to the side edges of the second panel.

A recording head having the improved shield, at a tape speed of 90 inches per second, possessed a crosstalk of less than 2 percent as compared to the same head without the improved shield under the same operating conditions, which possessed a crosstalk of 10 percent to 15 percent. The improved recording head in no way interfered with the normal operation of the associated equipment or the loading, unloading, sensing or threading of the tape or the use of tape cassettes or cartridges.

DESCRIPTION OF THE PREFERRED EMBODIMENT

Figure 1:
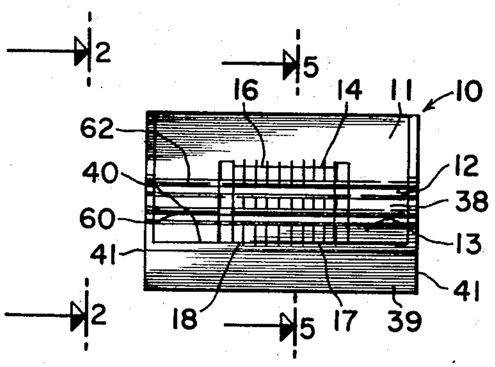
FIG. 1 is a front elevational view of a recording head embodying the present invention.
Figure 2:
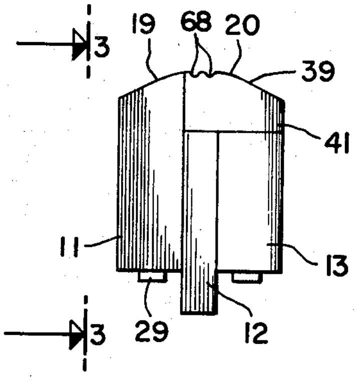
FIG. 2 is a side plan view thereof along lines 2—2 of FIG. 1.
Figure 3:
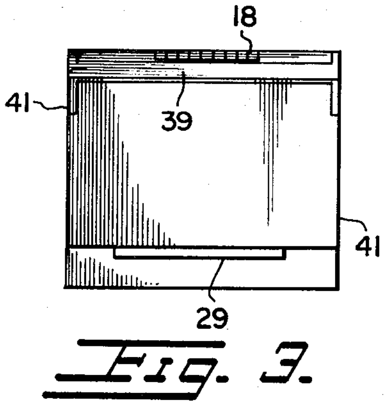
FIG. 3 is an end elevational view thereof along lines 3—3 of FIG. 2.

Referring now to the drawing which illustrates a preferred embodiment of the present invention as applied to a multi-channel read-write recording head, the reference numeral 10 generally designates the improved recording head which, except for the magnetic shield and its relationship with the transducer elements, is of generally known and conventional construction. The recording head 10 is formed of three side by side sections 11, 12 and 13, respectively, locked by screws or other fastening devices in assembled condition with section 12 sandwiched between sections 11 and 13. Head section 11 and the proximate side of section 12 have embedded therein a bank 14 of side by side stacked electromagnetic write transducers 16 and head section 13, and the proximate side of section 12 has embedded therein a bank 17 of side by side stacked electromagnetic read transducers 18. Front faces 19 and 20 of sections 11 and 13, respectively, are forwardly inwardly inclined to corresponding side edges of the front face of section 12, and are slightly convex. As shown, the front face of section 12 has a pair of grooves or depressions as is well known in the field.

Figure 4:
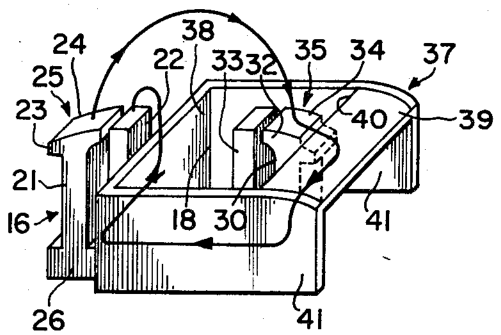
FIG. 4 is a diagrammatic perspective view illustrating the shape of the magnetic shield and its relationship to the magnetic cores.
Figure 5:
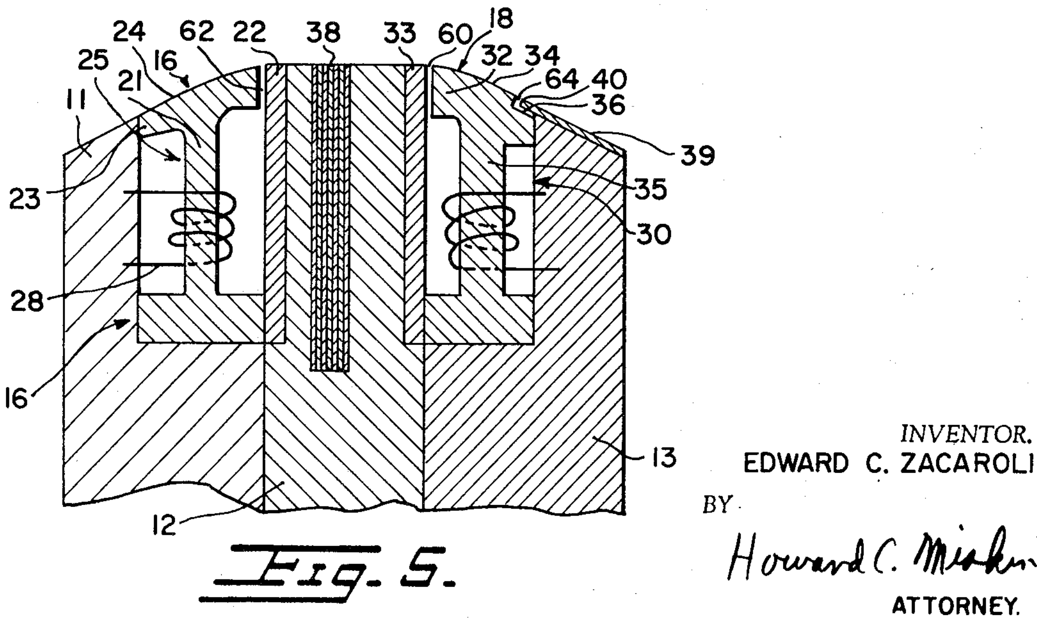
FIG. 5 is an enlarged cross-sectional view taken along lines 5—5 of FIG. 1.

As best seen in FIGS. 4 and 5, each of write transducers 16 comprises a core 25 of magnetic material, including a pole piece 21 embedded in head section 11, and pole piece 22 embedded in the confronting outer face of section 12. Pole piece 21 includes a longitudinally enlarged front head 23 having a front face 24 substantially coplanar with section face 19 and an enlarged rear head 26, the inside faces of heads 23 and 26 being substantially coplanar with the inside face of section 11. Pole piece 22 has the opposite ends of its outer face parallel and closely adjacent to the confronting end faces of head 23 and 26 to define a front transverse gap 62 and a rear contact therewith, respectively. A coil 28 is carried by the leg of pole piece 21 between heads 23 and 26 and is connected to a corresponding set of contacts of a multicontact connector 29 mounted on the rear face of section 11. Section 11 is formed of nonmagnetic materials, such as aluminum and organic plastics, and is advantageously a solid mass in which the various elements are embedded, including the transducers, leads and the like.

Each of the read transducers 18 likewise comprises a core 30 of magnetic material, including a pole piece 35 embedded in section 13 and which, except for the front enlarged head 32 thereof, is similar in shape and disposition to pole piece 21, and a pole piece 33 similar to pole piece 22 is embedded adjacent the opposite surface in section 12 and associated with pole piece 35 to provide front gap 60 in the manner of pole pieces 21 and 22. The front face 34 of pole piece head 32 is coplanar with front face 20, and is provided along its outer transverse edge with a transversely extending stepped shallow angular recess 36.

Shield 37 for minimizing crosstalk between the write and read transducers 14 and 18 is formed of a magnetically soft material of low reluctance and includes a rectangular first panel 38 which is embedded in intermediate section 12 and is offset toward the write bank 14 and is parallel to and between the confronting parallel faces of pole pieces 22 and 33. First panel 38 extends from the front face of intermediate section 12 to a point shortly rearwardly of the rear faces of cores 25 and 30 and extends for the full width of intermediate section 12. Panel 38 extends to a depth slightly longer than the depth of read pole piece 33 and not the full depth of the head. When the speed of the tape or magnetic source of signals is increased, such as greater than 150 inches per second, first panel 38 advantageously is formed of alternate layers of mu metal and ferrite to form a hybrid panel 38. It has been found that the maximum reduction of crosstalk occurs with hybrid panels having the flux density of the mu metal balanced with the flux density of the ferrite. Since the mu metal flux density is about 4 times that of ferrite, about 3 to 4 times more ferrite is used than mu metal in panel 38. The tape speed can also be equated in terms of microsecond rise time. It has been found that for 6 or more microsecond rise time, panel 38 can be made of all mu metal, but when there is less than 6 microsecond rise time, it is preferable to use a hybrid panel 38.

It has been found generally that the greater the offset the better reduction in read to write crosstalk is obtained. First panel 38 has been spaced about 0.010 inch from the closest pole of the write bank. The amount of offset depends on the material of the first panel, the head structure, and the recording frequency. These can be readily determined for the head assembly by one skilled in the art.

The shield 37 also includes a rectangular front panel 39 embedded in the front face of section 13. The front face of panel 39 defines the front face of section 13 and is coplanar with the front faces 34 of pole piece heads 32 and extends for the full width of section 13. The inner edge 40 of panel 39 substantially registers with recess 36 and is slightly spaced from the rear and inner faces thereof forming a gap 64 with the surface of recess 36 generally transverse to front face 34 of pole piece head 32. The amount of surface coupling between panel 39 and pole head 32 must be adjusted to provide the greatest reduction in crosstalk. Panel 39 is moved relative to the end of the recess 36 to adjust gap 64 to provide the maximum reduction in crosstalk. In effect adjusting gap 64 adjusts the coupling between pole head 32 and panel 39 by varying the amount that panel 39 overlies a portion of the recess 36 to produce a nulling pulse. A spacing of about 2 to 17 thousandths has been found satisfactory.

A pair of parallel plates or panels 41 are contiguous to opposite end faces of sections 12 and 13 and are formed of a magnetically soft, low reluctance magnetic material. The front edges of panels 41 coincide with the front faces of sections 12 and 13 and extend toward the side edges of the first panel 38 for the full height thereof to the respective side edges of the second panel 39 for the full lengths thereof, and provide a low reluctance magnetic flux path between the first and second panels 38 and 39. End panels 41 may cover the full area of the end faces of section 13 or areas thereof, extending from the front face thereof rearwardly to a point corresponding to the rear edge of first panel 38. If desired, panels 41 could extend fully across one or both ends of head 10. Panels 38, 39 and 41 may be formed of mu metal, ferrite or other materials having similar magnetic properties which are magnetically soft and of low reluctance or combinations thereof.

As a specific example of a recording head embodying the present invention, the read and write banks each contained nine transducer elements which were longitudinally aligned, and the longitudinal distance between the read and write front face gaps was 0.150 inch, and the transducer banks were medially located between the side faces of the head 10, such relationship being advantageously observed in other embodiments of the improved recording head. The depth of the inside pole pieces 22 and 33 was 0.260 inch, and the first panel 38 was of depth of 0.300 inch, was 0.020 inch thick and was spaced about 0.020 inch from the inside face of pole piece 22 and about 0.055 inch from the inside face of pole piece 33. Inner transverse edge 40 of second panel 39 was spaced between 0.005 inch and 0.010 inch from each of angular faces of recess 36, and between 0.060 inch and 0.080 inch from the front face gap of core 35. The overall length of head 10 was about 1.25 inches, its width about 0.775 inch, and its depth about 0.90 inch. Panels 38, 39 and 41 are formed of ferrite or mu metal or other similar material. It should be noted that the above dimensions and relationships have been found to result in a maximum reduction in crosstalk for the specific recording head, but for other recording heads the optimum dimensions and relationships may vary, depending on tape speed, frequency, head construction, but are of the same order as above.

An important feature is that a low reluctance magnetic flux path is provided from read pole piece 30 going through to panel 39 of the shield, through panels 41, to panel 38 and then to write pole piece 22 without going through the reading coils.

While the preferred embodiment utilizes a plurality of transducer elements in the form of banks, the present invention can be used also for a single track head. Also, transducer assemblies can be used with the present invention that have simple or complex curvature of the operating surface.

While the front face of section 12 contains grooves 68, such grooves are not essential to this invention. The front face of section 12 in FIG. 5 is shown generally smooth.

As illustrated in FIG. 4, the series of arrows show the direction of the nulling or bucking pulse, as best as can be determined.

While there has been described and illustrated a preferred embodiment of the present invention, it is apparent that numerous alterations, omissions and additions may be made without departing from the spirit thereof.

What is claimed is:

1. A magnetic tape recording head, including longitudinally spaced read and write electromagnetic transducers, each including a core of magnetic material having a gapped front face and a winding, the improvement comprising a crosstalk-reducing shield of a magnetic material, including a first panel positioned between said transducer cores, and a second panel the plane of which extends longitudinally outwardly from the outer edge of said read transducer front face, and means providing a low reluctance magnetic flux path between said first and second shield panels.

2. The recording head of claim 1, wherein said shield is formed of a magnetically soft, low reluctance material.

3. The recording head of claim 2, wherein the distance between said write transducer and said first panel is less than the distance between said read transducer and said first panel.

4. The recording head of claim 2, wherein said low reluctance path means comprises a pair of parallel third panels of a magnetically soft, low reluctance material extending between said first and second panels above and below said read transducer.

5. The recording head of claim 2, wherein the inner edge of said second panel is spaced from said read transducer core.

6. The recording head of claim 2, wherein said first panel extends from the level of said transducer core front faces at their inner edges to a point shortly behind the rear edges of said transducer cores.

7. The recording head of claim 1 wherein said first panel is formed of a combination of mu metal and ferrite.

8. The recording head of claim 1 wherein said front panel is formed of a plurality of layers of ferrite and mu metal, the amount of ferrite being about 3 to 4 times the amount of mu metal.

9. The recording head of claim 1, including a plurality of said read and write transducers arranged in a pair of longitudinally spaced banks of transversely spaced similar transducers, each including a winding carrying magnetic core with a transversely gapped front face, said first panel being positioned between said transducer banks and being longitudinally offset toward said bank of write transducers and extending from about the plane between the front faces of said transducer banks to shortly behind said transducer banks, said second panel lying substantially in the plane of the front face of said read transducer cores and having an inner edge spaced closely to the outer edge of said front face of said bank of read transducers, and said low reluctance path means comprises a pair of parallel transversely spaced third panels connecting the respective ends of said first and second panels.

10. The recording head of claim 9, where said transducer banks are disposed approximately midway between said third panels.

11. The recording head of claim 9 wherein the distance between the inner edge of said second panel and the outer edge of said read transducer bank provides a null point for all heads.

12. The recording head of claim 9, wherein the distance between the inner edge of said second panel and the outer edge of said read transducer bank front face is between 0.002 and 0.017 inch.

13. The recording head of claim 9, wherein the outer edge of said bank of read transducer cores is stepped to define a longitudinally angular groove, the inner border of said second panel registering with said grooves and spaced from the faces thereof.

* * * * *